United States Patent
Reinbold

(10) Patent No.: US 12,252,353 B2
(45) Date of Patent: Mar. 18, 2025

(54) METHOD FOR FEEDING ELONGATE WORKPIECES OF WOOD, PLASTIC MATERIAL, AND THE LIKE AS WELL AS DEVICE FOR PERFORMING THE METHOD

(71) Applicant: Weinig Dimter GmbH & Co. KG, Illertissen (DE)

(72) Inventor: Georg Reinbold, Biberach (DE)

(73) Assignee: Weinig Dimter GmbH & Co. KG, Illertissen (DE)

( * ) Notice: Subject to any disclaimer, the term of this patent is extended or adjusted under 35 U.S.C. 154(b) by 602 days.

(21) Appl. No.: 17/502,063

(22) Filed: Oct. 15, 2021

(65) Prior Publication Data
US 2022/0119207 A1    Apr. 21, 2022

(30) Foreign Application Priority Data
Oct. 15, 2020   (DE) .................... 10 2020 006 458.2

(51) Int. Cl.
*B65G 47/34*   (2006.01)
*B65G 47/88*   (2006.01)

(52) U.S. Cl.
CPC ......... *B65G 47/34* (2013.01); *B65G 47/8815* (2013.01); *B65G 2201/0217* (2013.01)

(58) Field of Classification Search
None
See application file for complete search history.

(56) References Cited

U.S. PATENT DOCUMENTS

| | | | |
|---|---|---|---|
| 3,339,917 A | 9/1967 | Petrovsky | |
| 3,866,740 A * | 2/1975 | Greathead .............. | B65G 47/29 198/463.3 |
| 5,100,124 A * | 3/1992 | Pouliquen .............. | B65H 29/66 198/418.9 |
| 6,062,376 A * | 5/2000 | Nerenhausen, Sr. .. | B65G 47/29 198/809 |
| 6,302,260 B1 * | 10/2001 | Hansch .............. | B65H 29/6654 271/264 |
| 7,497,318 B2 * | 3/2009 | Lin ........................ | B65H 33/12 198/418.9 |
| 7,909,157 B2 * | 3/2011 | Giuliani ................. | B65G 57/32 198/418.9 |
| 10,238,123 B2 * | 3/2019 | Willburger .............. | A23L 13/65 |

FOREIGN PATENT DOCUMENTS

DE    10 2016 010 456        3/2018
WO    WO-2013074019 A1 *    5/2013   .......... B27B 31/006

* cited by examiner

*Primary Examiner* — Kavel Singh
(74) *Attorney, Agent, or Firm* — Gudrun E. Huckett

(57) ABSTRACT

Elongate workpieces are transported in a transport direction and assembled to a string in the transport direction. A leading elongate workpiece is removed from the string and accelerated in a downstream discharge device such that a gap is formed between the leading elongate workpiece and a following elongate workpiece of the string. A stop is moved into the gap and prevents the following elongate workpiece of the string from being transported farther. The stop is removed when the leading elongate workpiece has left the discharge device and then the following elongate workpiece is removed from the string.

4 Claims, 4 Drawing Sheets

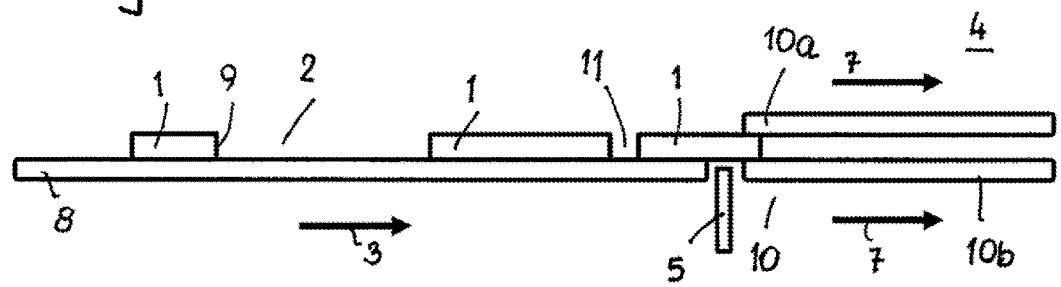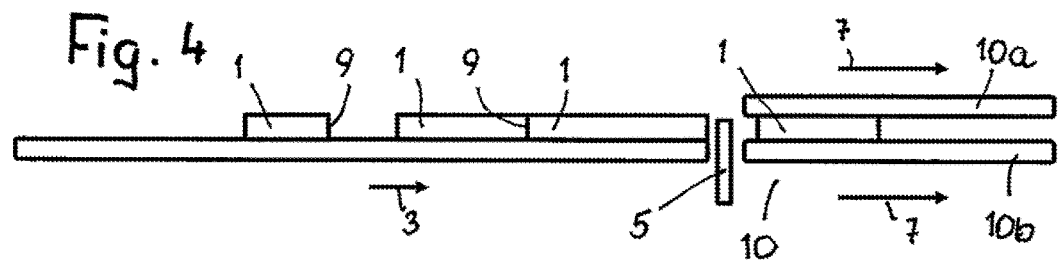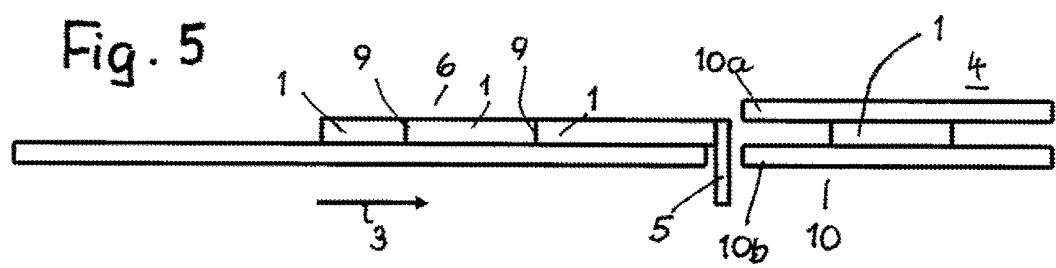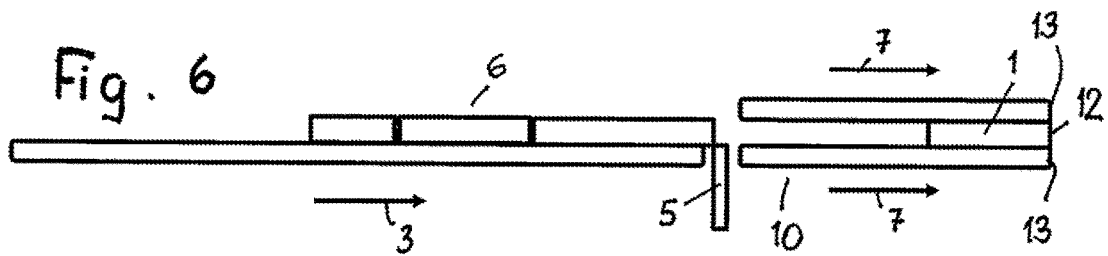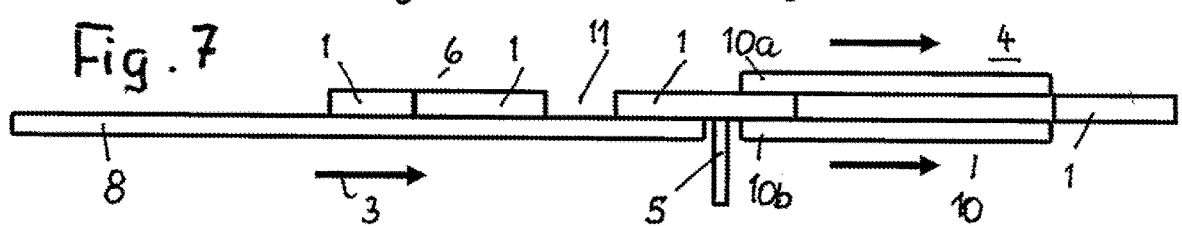

METHOD FOR FEEDING ELONGATE WORKPIECES OF WOOD, PLASTIC MATERIAL, AND THE LIKE AS WELL AS DEVICE FOR PERFORMING THE METHOD

BACKGROUND OF THE INVENTION

The invention relates to a method for feeding elongate workpieces of wood, plastic material, and the like as well as a device or apparatus for performing the method.

It is known to produce boards or panels from elongate workpieces in that workpieces that are provided at their ends with finger joints are assembled to form a string of workpieces and are glued together, wherein the string subsequently is divided to desired lengths and the thus produced workpiece parts are then glued together, with their longitudinal sides resting against each other, to produce boards or panels. From such panels, for example, wall elements, door leaves, and the like can be produced.

It is the object of the invention to configure such a method and such a device or apparatus in such a way that high numbers of cycles of feeding the workpieces can be achieved.

SUMMARY OF THE INVENTION

In accordance with the invention, this is achieved by a method for feeding elongate workpieces of wood, plastic material, and the like that are first assembled to a string from which sequentially the workpieces are individually removed and in a discharge region are accelerated such that, between the removed workpiece and the remainder of the string, a gap is formed into which at least one stop is moved that prevents the remainder of the string from being transported farther, and wherein the stop releases the remainder of the string for removal of the next workpiece when the previously removed workpiece has left the discharge region.

In accordance with the invention, this is further achieved by an apparatus for performing the method, comprising a feed device and at least one downstream discharge device for the workpieces, wherein the feed device comprises at least one transport device and the discharge device comprises at least one transport device, wherein the transport devices extend in alignment with each other and are driveable independently of each other, wherein between the feed device and the discharge device at least one stop is provided that is moveable into the transport path of the workpieces.

In the method according to the invention, the elongate workpieces are first assembled to a string. The workpieces in the string are arranged in a sequential arrangement with their end faces resting against each other. The workpieces are then individually removed from this string and fed to a discharge region. The removed workpiece is accelerated such that a gap is formed between the workpiece and the remainder of the string. This gap formation can be achieved in that the discharge speed of the removed workpiece in the discharge region is greater than the feed speed in the feed region so that the gap is formed due to the difference in speeds when removing the workpiece. The gap formation can also be achieved in that the feed speed up to the discharge region is reduced so that the workpiece in the discharge region also exhibits a speed that is higher than the speed in the feed region. In this case, the acceleration is achieved in that the feed speed of the workpiece is reduced in comparison to the discharge speed in the discharge region.

As soon the gap between the removed workpiece and the remainder of the workpiece string is formed, the stop is moved into the gap and prevents that the remainder of the string moves into the discharge region. The remainder of the string remains thus in the feed region and is retained thereat. In this way, an individual workpiece is always transported farther in the discharge region. As soon the workpiece has left the discharge region, the stop releases the remainder of the string so that now the next workpiece that is positioned at the leading end of the string can be fed into the discharge region.

As long as the stop is in the stop position, further workpieces can be joined to the string. In this way, it is ensured that in the string upstream of the discharge region always a sufficient number of workpieces are arranged so that feeding of workpieces into the discharge region is not interrupted.

In this manner, a very high number of cycles in regard to throughput of the workpieces can be achieved without this requiring a complex method control.

In an advantageous embodiment, the feed speed of the workpieces for forming the string is less than the discharge speed of the removed workpiece in the discharge region. This is provided when the stop is not in its stop position. As long as the stop stops the string, the feed speed of the workpieces can be definitely higher so that the following workpieces can be added quickly to the string in the feed region.

Advantageously, a high number of cycles is achieved when the removed workpiece as it leaves the discharge region has a predetermined minimal discharge speed. In this way, it can be achieved that all workpieces that are leaving the discharge region can exit and be supplied to further processing at a correspondingly high discharge speed.

It is advantageous when the removed workpiece reaches the predetermined minimal discharge speed at least at the moment when the leading end of the removed workpiece in transport direction reaches the end of the discharge region.

For reaching a high number of feed cycles, it is particularly advantageous when the removed workpiece maintains the predetermined minimal discharge speed until it has left the discharge region.

A particularly preferred embodiment is provided when the discharge speed of the removed workpiece as it passes the discharge region is adjusted such that is leaves the discharge region in a predetermined speed range and in a predetermined time interval.

The apparatus according to the invention is characterized in that, for feeding the workpieces, it comprises at least one feed device that has arranged downstream thereof a discharge device for the workpieces. The transport device of the feed device and the transport device of the discharge device are aligned with each other and can be driven independently of each other. In this way, the speed of the workpieces in the feed region and the speed in the discharge region can be optimally adjusted to each other in order to achieve a high throughput of the workpieces through the apparatus. The transport device can be, for example, transport belts with which the elongate workpieces can be transported reliably.

Between the feed device and the discharge device, at least one stop is provided which can be moved into the transport path of the workpieces. The distance between the feed device and the discharge device is selected such that even the shortest workpieces which are combined in the string of workpieces can be moved without problem from the feed device into the discharge device.

The transport device and the feed device are designed such that they can feed the workpieces to the string that is being formed in the feed device even when the string is contacting the stop. In this case, the transport device moves along the string of workpieces.

A simple adjustment of the speeds of the drives for the feed device, the discharge device, and the stop is provided when the drives are connected to a control. Then, by means of the control, the optimal speed of the transport devices can be adjusted depending on the respective transport situation in the apparatus.

In an advantageous embodiment, the minimal length of the discharge device measured in the transport direction of the workpieces results from the maximum length of the workpieces as well as the braking distance from the discharge speed to standstill and the acceleration distance from standstill to the discharge speed.

Advantageously, the discharge device has arranged downstream thereof at least one transverse conveyor in which the workpieces can be transported transverse to their length direction.

In order for the workpieces that are to be transported transversely to the length direction to be aligned relative to each other, at least one alignment unit is provided in the transverse conveyor. It is positioned in the transport path of the workpieces that, when transversely transported, run against the alignment unit with a corresponding end face and, due to this stop position, are aligned transversely to their transport direction, i.e., in the length direction. In this way, it is achieved in a simple manner that the workpieces, independent of their respective length, are aligned relative to each other such that end faces of the workpieces that are contacting the alignment unit are positioned in the same plane at least approximately.

It is advantageous when the feed device and the discharge device comprise not only one workpiece channel but at least two workpiece channels. Then, at the same time two or more strings of workpieces can be transported. The workpieces of these different strings then reach the transverse conveyor in which they are arranged one behind the other, in relation to the length direction.

In an advantageous manner, the apparatus according to the invention is preferably arranged upstream of a finger jointing device in which the workpieces are provided first at their end faces with finger joints and are then joined at the end face to each other by gluing to produce an endless string. From this string, parts of a desired length are cut which are subsequently glued together at their longitudinal sides resting against each other so that correspondingly boards or panels are formed.

The subject matter of the application results not only from the subject matter of the individual claims but also from all specifications and features disclosed in the drawings and in the description. Even if the disclosed specifications and features are not subject matter of the claims, they are considered to be important to the invention, provided they—individually or in combination—are novel in relation to the prior art.

Further features of the invention result from the additional claims, the description, and the drawings.

BRIEF DESCRIPTION OF THE DRAWING

The invention will be explained in the following in more detail with the aid of the embodiment illustrated in the drawing.

FIG. 3 shows schematically a first step of a sequence for individualizing and discharging workpieces with the apparatus according to the invention.

FIG. 4 shows a step of the sequence according to the invention following the step of FIG. 3.

FIG. 5 shows a step of the sequence according to the invention following the step of FIG. 4.

FIG. 6 shows a step of the sequence according to the invention following the step of FIG. 5.

FIG. 7 shows a step of the sequence according to the invention following the step of FIG. 6.

DESCRIPTION OF PREFERRED EMBODIMENTS

Figure 1:
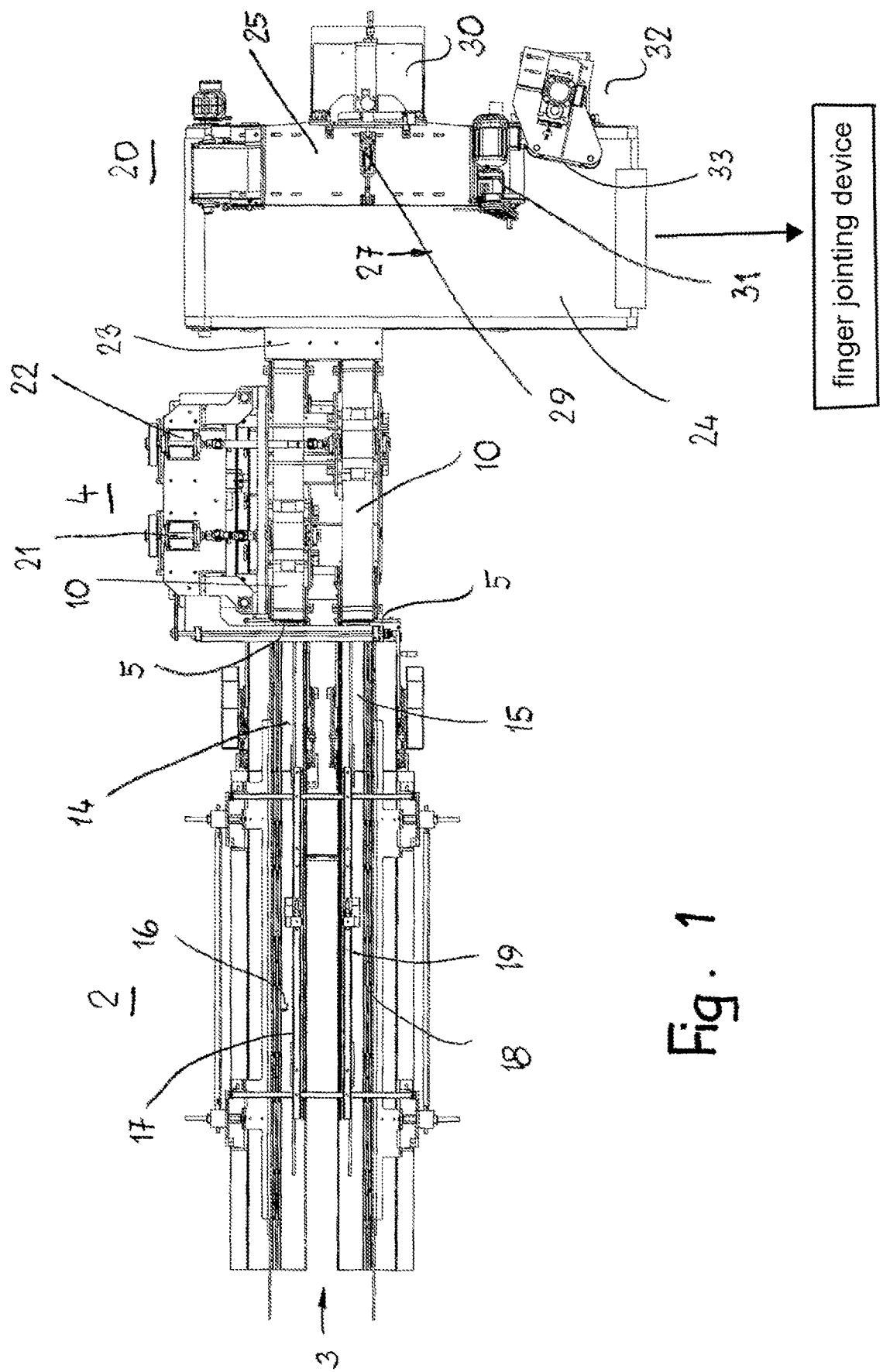
FIG. 1 shows a plan view of an apparatus according to the invention.

The apparatus described in the following serves for feeding and individualizing elongate workpieces of wood, plastic material, and the like. These elongate workpieces are used, for example, for producing panels or boards in which the workpieces are glued together behind one another and adjacent to each other. The elongate workpieces have in general a rectangular cross section and are of a rectangular shape.

With the aid of FIGS. 3 to 7, first the sequence of individualizing of the elongate workpieces 1 will be described which are advantageously configured as slats. The workpieces 1 are transported by means of a feed device 2 in their length direction in the transport direction 3 in the direction toward a discharge region of a discharge device 4.

The workpieces 1 can have the same length but can also have different lengths. On the feed device 2, the workpieces 1 are first accumulated one after another at a stop device 5 in the transport direction 3 so that the workpieces 1, which are transported initially at a distance relative to each other, adjoin each other and form a string 6 (FIG. 5).

The discharge device 4 adjoins the feed device 2 in the transport direction 3. By means of the discharge device 4, the workpieces 1 are transported in the transport direction 7 in their length direction. The discharge speed of the discharge device 4 is higher than the feed speed of the workpieces 1 in the feed device 2. The workpieces 1 are transported in the discharge device 4 at a discharge speed that is significantly higher than the feed speed of the workpieces 1 in the feed device 2.

By means of the blocking device 5 which can also be referred to as stop and which is located in the region between the feed device 2 and the discharge device 4, the workpieces 1 are stopped in the feed device 2. In this context, the feed device 2 is configured such that the transport device 8 of the feed device 2 that is advantageously an endless circulating belt is always driven. In this way, the workpieces 1 are always transported in transport direction 3 until the leading workpiece 1 in the transport direction 3 comes to rest against the stop or blocking device 5 and the following workpieces 1 contact each other with their end faces. This situation is illustrated in an exemplary fashion in FIG. 5. A comparison of FIGS. 4 and 5 shows how the workpieces 1 are transported one after another in the transport direction 3 until they are contacting each other with their end faces and form the string 6.

The stop or blocking device 5 is moved into the transport path of the workpieces 1 when the string 6 is to be formed in the feed device 2. The length of the string 6 depends on how long the stop or blocking device 5 remains in the stop position illustrated in FIGS. 4 and 5.

With the discharge device 4, the workpieces 1 are transported individually in the transport direction 7. So that the leading workpiece 1 can move into the discharge device 4, the stop or blocking device 5 is moved into its release position in which it releases the string 6 arranged in the feed device 2. Then, the leading workpiece 1 of the string 6 in the transport direction 3 can be fed by the transport device 8 of the feed device 2 to the discharge device 4 (FIG. 3).

As soon as this leading workpiece 1 has reached the discharge region of the discharge device 4, it is engaged by a transport device 10 of the discharge device 4 and accelerated and transported in the transport direction 7. Since the transport device 10 has a higher speed than the transport device 8 of the feed device 2, a gap 11 is formed between the leading workpiece 1 supplied to the discharge device 4 and the following workpiece 1 so that the stop or blocking device 5 can return into the gap 11 (FIG. 4) after the leading workpiece 1 has passed it. Accordingly, the following workpiece 1 can no longer be transported in the direction toward the discharge device 4 but is stopped at the stop or blocking device 5 (FIG. 5).

In the discharge device 4, the leading workpiece 1 is accelerated such that the gap 11 is sufficiently large so that the stop or blocking device 5 has sufficient time to move into the gap 11 and to hinder in this way the following workpiece 1 from being transported farther.

As long as the leading workpiece 1 is transported in the discharge device 4, further workpieces 1 are continued to be transported in the feed device 2 so that at the stop or blocking device 5 the string 6 continues to be formed (FIG. 5).

As is illustrated with the aid of FIG. 5 in an exemplary fashion, the leading workpiece 1 in the discharge device 4 can be stopped as needed in that the transport device 10 is stopped.

The discharge device 4 can be controlled such that the leading workpiece 1 exits from the discharge device 4 within a predetermined speed range and within a predetermined time interval. The minimal length of the discharge device 4 measured in transport direction 7 results from the maximum length of the workpieces 1, the braking distance from the discharge speed of the discharge device 4 to standstill and the acceleration distance from standstill to discharge speed.

As soon as the leading end 12 of the workpiece 1 in the transport direction 7 has reached the leading end 13 of the discharge device 4 in transport direction 7 (FIG. 6), the stop or blocking device 5 can be deactivated in order to release the path for the following workpiece 1 to move from the feed device 2 into the discharge device 4. Then the workpiece 1 in the feed device 2 which has contacted initially the stop or blocking device 5 can be fed by the transport device 8 of the feed device 2 to the discharge device 4. At the same time, the leading workpiece 1 which is located in the discharge device 4 is transported farther.

FIG. 7 shows the situation in which the leading workpiece 1 has just left the discharge device 4 and the following workpiece 1 has been partially engaged by the transport device 10 of the discharge device 4. Since the discharge speed of the discharge device 4 is greater than the speed of the transport device 8 of the feed device 2, the gap 11 between the workpiece 1 that is now entering the discharge device 4 and the next workpiece 1 of the string 6 is formed in the described way so that the stop or blocking device 5 can be moved again into its stop position as soon as the workpiece 1 entering now the discharge device 4 has passed the stop or blocking device 5.

The blocking device 5 can be preferably moved into its stop position when the workpiece 1 is completely transferred to the discharge device 4. In principle, it is also possible to configure the feed device 2 and the discharge device 4 such that the stop or blocking device 5 can already reach its stop position when the leading workpiece 1 in transport direction 3 has not yet been completely received in the discharge device 4.

With the described method, it is possible to feed the workpieces 1 optimally within a short period of time to a subsequent processing which will be explained with the aid of FIGS. 1 and 2 in more detail in the following.

In the described method, in the discharge device 4 the workpieces 1 are transported at a higher speed than in the feed device 2. As soon the leading workpiece 1 has been engaged by the discharge device 4, the following workpiece in the feed device 2 can be stopped in a defined manner. During the transport of the leading workpieces 1 through the discharge device 4, the further workpieces 1 in the feed device 2 can be continued to be fed dynamically so that at the stop or blocking device 5 they form the string 6 in that the workpieces 1 come to rest against each other with their end faces. The workpieces 1 can have the same length. In general, the workpieces 1 have however different lengths.

The discharge device 4 is designed such that each workpiece 1 exits at a predetermined minimal speed from the discharge device 4. This means that the leading end face 12 of the workpieces 1 in transport direction 7 exhibits the predetermined minimal speed when this end face 12 has reached the end 13 of the discharge device 4. This minimal speed is not undershot until the workpiece 1 has left the discharge device 4.

In principle, there is the possibility of varying the speed of the transport device 8 of the feed device 2. This is particularly advantageous when long workpieces 1 are transported and/or when differently large distances between workpieces 1 positioned one after another are existing when transporting the workpieces 1 in the feed device 2. By control of the speed of the transport device 8, it can be achieved that the workpieces 1 in the feed device 2 form a sufficiently long string 6 as long as the stop or blocking device 5 is in its stop position.

In order to detect the position of the leading workpiece 1 upon entering the discharge device 4 or upon exiting from the discharge device 4, advantageously corresponding sensors are used. At least one sensor detects the end face 12 of the leading workpiece 1 at the moment at which it has reached the end 13 of the discharge device 4 (FIG. 6). Then the sensor sends a corresponding signal to the control (FIG. 2a) so that the control can move the blocking device 5 into its release position (FIGS. 6 and 7).

Advantageously, at least a further sensor is provided and monitors whether the gap 11 between the leading workpiece 1 that is positioned in the discharge device 4 and the following workpiece 1 that is located in the feed device 2 is sufficiently large in order to move the stop or blocking device 5 into the stop position.

Should the gap 11 be too small, the control receives from this sensor a corresponding signal so that the control (FIG. 2a) either reduces the speed of the transport device 8 and/or increases the speed of the transport device 10. With such a control action, it can be reliably ensured that during operation only one workpiece 1 at a time reaches the discharge device 4.

Figure 2:
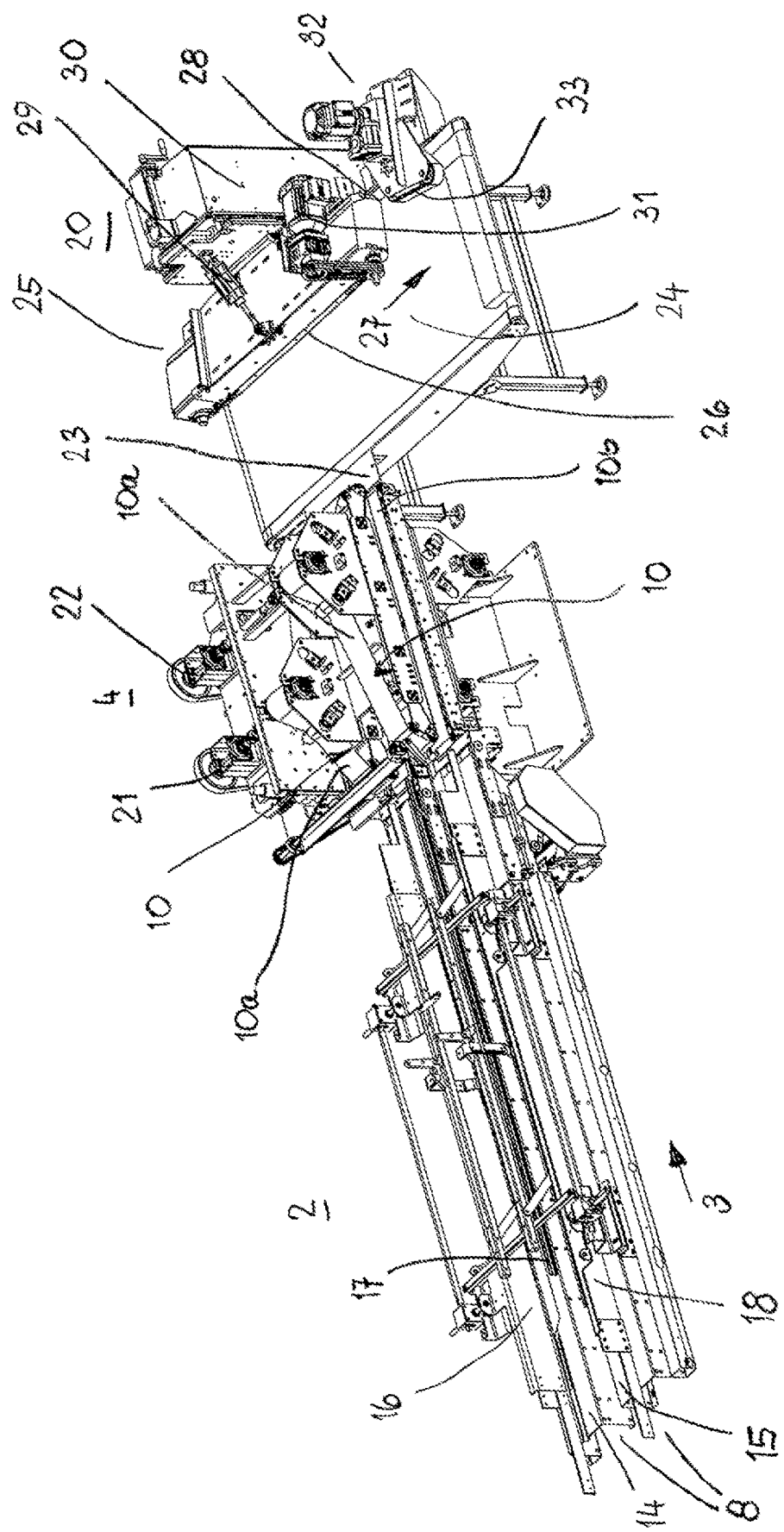
FIG. 2 shows the apparatus of the invention according to FIG. 1 in a perspective illustration.
Figure 2A:
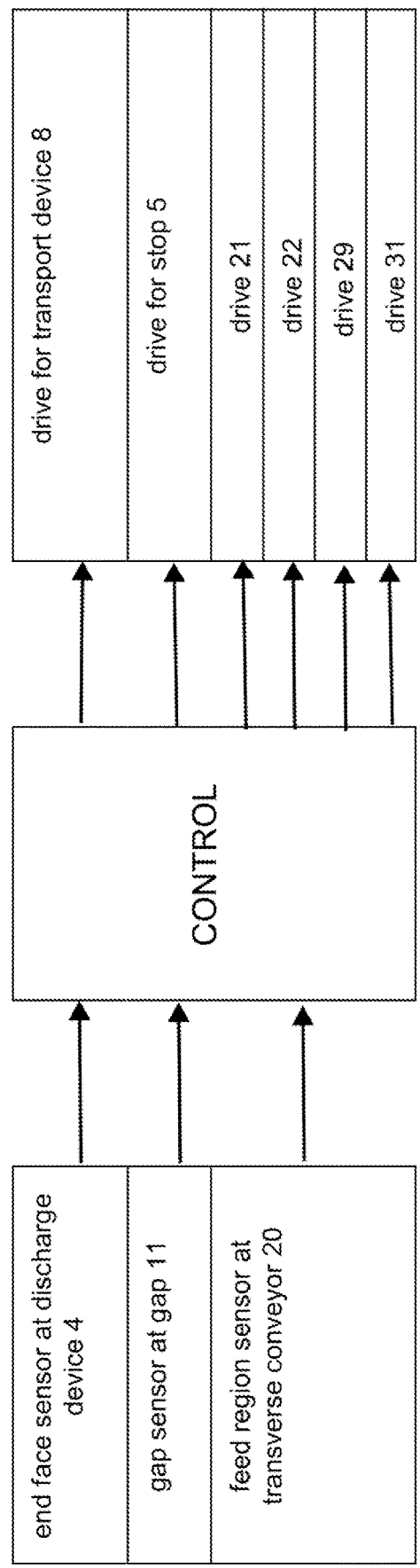
FIG. 2a shows schematically the control of the apparatus with sensors and drives.

FIGS. 1 and 2 show an exemplary apparatus with the feed device 2 and the discharge device 4. The illustrated apparatus is however to be understood only as one possibility of an embodiment of the invention. The described configuration is therefore not to be understood as limiting.

The apparatus is designed such that the workpieces 1 can be transported on the apparatus in the transport direction 3 along two parallel paths that are positioned adjacent to each other at a distance. For the workpieces 1, two parallel guide paths 14, 15 are provided which extend in transport direction 3 at a distance to each other. Advantageously, the guide paths 14, 15 are formed by endless circulating belts or bands on which the workpieces 1 are resting loosely. Each guide path 14, 15 can comprise a lengthwise guide 16, 17; 18, 19 for guiding the workpieces 1 in length direction. These lengthwise guides can be configured such that the workpieces 1 during their transport rest against them with at least one longitudinal side.

At the leading end in transport direction 3, the stop or blocking device 5 is provided which is designed, for example, as a stop pawl. It can be moved from the stop position into the release position, for example, pivoted or displaced upwardly or downwardly, or can be laterally pushed away.

The discharge device 4 comprises the two transport devices 10 which are positioned aligned to the guide paths 14, 15 of the transport device 8.

The transport device 10 are formed by two endless circulating acceleration belts 10a, 10b, respectively, which are arranged on top of each other and between which the workpieces 1 are entrained during transport through the discharge device 4. The two transport belts 10a, 10b are arranged at such a distance one above the other such that the workpieces 1 that are disposed between the oppositely positioned and facing runs of these transport belts 10a,10b can be reliably entrained.

The two transport devices 10 of the discharge device 4 are advantageously driven independently of each other so that the workpieces in the two rows can be fed in a targeted fashion to the downstream transverse conveyor 20. The two drives 21, 22 for the transport device 10 are connected to the control of the apparatus so that the transport device 10 can be controlled or regulated as needed.

The workpieces 1 are transported by the feed device 2 and the discharge device 4 in the described manner in their length direction. After exiting from the discharge device 4, the workpieces 1 reach the transverse conveyor 20. The workpieces 1 are transported perpendicularly to their length direction in the transverse conveyor 20. Between the discharge device 4 and the transverse conveyor 20, there is at least one transfer path 23 which is formed by sheet metal in the illustrated embodiment. On the transfer path 23, the workpieces 1 are transported in their length direction from the discharge device 4 to a support table 24 of the transverse conveyor 20. In the feed region of the workpieces 1, there is a catch unit 25 that is provided with at least one endless circulating conveyor band 26. It conveys the workpieces perpendicularly to the transport direction 3 in the transport direction 27.

The catch unit 25 can be pivoted by means of at least one pivot drive 29 about an axis 28 that is positioned in transport direction 27. The pivot drive 29 is, for example, a piston-cylinder unit connected to a stand 30 as well as to the catch unit 25.

So that the workpieces 1 can move below the catch unit 25, the catch unit 25 is pivoted during feeding of the workpieces 1 so far upwardly that the workpieces 1 can move underneath the conveyor band 26. In the feed direction of the workpieces 1, the catch unit 25 is advantageously provided with a stop and the workpieces 1 contact the stop with one end. By means of the conveyor band 26, the workpieces 1 are subsequently transported, after lowering the catch unit 25, transverse to their length direction in the transport direction 27.

Since on the feed device 2 two strings of workpieces 1 are formed, the workpieces 1 of both strings reach the support table 24.

For driving the conveyor band 26, a drive 31 is provided which is advantageously connected to the control of the apparatus. In this way, the conveyor band 26 can be advantageously driven in a controlled fashion such that the workpieces 1 are transported reliably.

The catch unit 25 is provided with an alignment unit 32 in transport direction 27. The alignment unit 32 serves to align the workpieces 1 transported by the catch unit 25 in regard to their length direction in such a way that these workpieces 1 subsequently can be supplied to a finger jointing device in an ordered manner.

The alignment unit 32 has at least one endless circulating alignment belt 33 which is movable about axes positioned perpendicularly to the support table 24. The alignment belts 33 are positioned at an angle at a slant to the transport direction 27. The workpieces 1 which are exiting from the catch unit 25 move with their right end face in FIGS. 1 and 2 so as to contact the alignment belt 33 which, as a result of its slanted position in relation to the transport direction 27, pushes the workpieces 1 in their length direction to the left in FIGS. 1 and 2. In this way, the workpieces are aligned relative to each other such that their right end faces in FIGS. 1 and 2, after exiting from the alignment unit 32, are positioned at least approximately in a plane that is parallel to the transport direction 27. In this way, the workpieces 1 reach in an ordered and aligned fashion the finger jointing device in which the workpieces 1, as is known in the art, are joined in their length direction one after another to a string wherein at the end faces of the workpieces positioned one after another the finger joints are milled.

The transport device 10 of the discharge device 4 can be controlled such that the workpieces are transferred at a number of feed cycles in an ordered fashion to the transverse conveyor 20. The discharge speed in the discharge device 4 depends on whether the workpieces 1 of the transverse conveyor 20 can be transferred in an ordered fashion. For example, the transport device 10 can be stopped when in the infeed region of the workpieces 1 in the transverse conveyor 20 there are still workpieces 1 present. As needed, it may be sufficient in such cases to reduce the speed of the transport device 10 so that the workpieces 1 which are coming in from the discharge device 4 can reach a free region of the transverse conveyor 20.

Advantageously, the feed region of the workpieces 1 in the transverse conveyor 20 is monitored by sensors that ensure that no workpieces 1 are fed from the discharge device 4 to the transverse conveyor 20 as long as workpieces 1 are still present in the feed region in the transverse conveyor 20. Since the corresponding drives in the described manner are connected to the control (FIG. 2a), the individual transport devices 10, 26 can be adjusted optimally to each other.

In the described embodiment, feeding the workpieces 1 is carried out in two channels. Of course, feeding can also be done in one channel or a plurality of channels. By use of a plurality of such units, in a simple manner there is the possibility of reaching high numbers of feed cycles of feeding the workpieces 1.

The specification incorporates by reference the entire disclosure of German priority document 10 2020 006 458.2 having a filing date of Oct. 15, 2020.

While specific embodiments of the invention have been shown and described in detail to illustrate the inventive principles, it will be understood that the invention may be embodied otherwise without departing from such principles.

What is claimed is:

1. An apparatus for performing a method comprising: transporting elongate workpieces in a transport direction corresponding to a length direction of the elongate workpieces and assembling the elongate workpieces to form a string in the transport direction, wherein end faces of the elongate workpieces facing each other in the string contact each other in the transport direction; removing a leading elongate workpiece from the string and transferring the leading elongate workpiece to a discharge device; accelerating the leading elongate workpiece in the discharge device such that a gap is formed between the leading elongate workpiece and a following elongate workpiece of the string; moving a stop into the gap and preventing the following elongate workpiece of the string from being transported farther; removing the stop when the leading elongate workpiece has left the discharge device and removing the following elongate workpiece from the string; the apparatus comprising:

a feed device comprising a first transport device configured to transport elongate workpieces in a length direction of the elongate workpieces;

a discharge device arranged downstream of the feed device and comprising a second transport device configured to transport the elongate workpieces in the length direction of the elongate workpieces;

a transverse conveyor arranged downstream of the discharge device, the transverse conveyor configured to transport the elongate workpieces in a transport direction transverse to the length direction of the elongate workpieces;

wherein the first transport device and the second transport device are aligned with each other in the transport direction of the elongate workpieces;

wherein the first transport device and the second transport device are configured to be driven independently from each other;

a stop arranged between the feed device and the discharge device and configured to be moved into a transport path of the elongate workpieces from the feed device into the discharge device;

a control, wherein the first transport device comprises a first drive, wherein the second transport device comprises a second drive, wherein the stop comprises a third drive, wherein the first drive, the second drive, and the third drive are connected to the control.

2. The apparatus according to claim 1, wherein the transverse conveyor comprises an alignment unit positioned in a transport path of the elongate workpieces in the transport direction transverse to the length direction of the elongate workpieces and configured to align the elongate workpieces in the length direction of the elongate workpieces.

3. An apparatus for performing a method comprising: transporting elongate workpieces in a transport direction corresponding to a length direction of the elongate workpieces and assembling the elongate workpieces to form a string in the transport direction, wherein end faces of the elongate workpieces facing each other in the string contact each other in the transport direction; removing a leading elongate workpiece from the string and transferring the leading elongate workpiece to a discharge device; accelerating the leading elongate workpiece in the discharge device such that a gap is formed between the leading elongate workpiece and a following elongate workpiece of the string; moving a stop into the gap and preventing the following elongate workpiece of the string from being transported farther; removing the stop when the leading elongate workpiece has left the discharge device and removing the following elongate workpiece from the string; the apparatus comprising:

a feed device comprising a first transport device configured to transport elongate workpieces in a length direction of the elongate workpieces;

a discharge device arranged downstream of the feed device and comprising a second transport device configured to transport the elongate workpieces in the length direction of the elongate workpieces;

a transverse conveyor arranged downstream of the discharge device, the transverse conveyor configured to transport the elongate workpieces in a transport direction transverse to the length direction of the elongate workpieces;

wherein the first transport device and the second transport device are aligned with each other in the transport direction of the elongate workpieces;

wherein the first transport device and the second transport device are configured to be driven independently from each other;

a stop arranged between the feed device and the discharge device and configured to be moved into a transport path of the elongate workpieces from the feed device into the discharge device;

wherein a minimal length of the discharge device measured in the transport direction corresponds to a maximum length of the elongate workpieces and to a braking distance from a discharge speed to a standstill and to an acceleration distance from standstill to the discharge speed.

4. An apparatus for performing a method comprising: transporting elongate workpieces in a transport direction corresponding to a length direction of the elongate workpieces and assembling the elongate workpieces to form a string in the transport direction, wherein end faces of the elongate workpieces facing each other in the string contact each other in the transport direction; removing a leading elongate workpiece from the string and transferring the leading elongate workpiece to a discharge device; accelerating the leading elongate workpiece in the discharge device such that a gap is formed between the leading elongate workpiece and a following elongate workpiece of the string; moving a stop into the gap and preventing the following elongate workpiece of the string from being transported farther; removing the stop when the leading elongate workpiece has left the discharge device and removing the following elongate workpiece from the string; the apparatus comprising:

a feed device comprising a first transport device configured to transport elongate workpieces in a length direction of the elongate workpieces;

a discharge device arranged downstream of the feed device and comprising a second transport device configured to transport the elongate workpieces in the length direction of the elongate workpieces;

a transverse conveyor arranged downstream of the discharge device, the transverse conveyor configured to transport the elongate workpieces in a transport direction transverse to the length direction of the elongate workpieces;
wherein the first transport device and the second transport device are aligned with each other in the transport direction of the elongate workpieces;
wherein the first transport device and the second transport device are configured to be driven independently from each other;
a stop arranged between the feed device and the discharge device and configured to be moved into a transport path of the elongate workpieces from the feed device into the discharge device;
wherein the apparatus is configured to be arranged upstream of a finger jointing device.

* * * * *